United States Patent [19]
Phillips

[11] Patent Number: 5,078,194
[45] Date of Patent: Jan. 7, 1992

[54] AUTOMATIC RETRACTABLE SHADE MOUNTING CASE

[76] Inventor: Arthur J. Phillips, 492 Morrison St., Carbondale, Colo. 81623

[21] Appl. No.: 592,521

[22] Filed: Oct. 4, 1990

[51] Int. Cl.⁵ .............................................. B60J 3/00
[52] U.S. Cl. ................... 160/84.1; 160/370.2; 296/97.7; 296/97.8; 296/97.9; 296/138
[58] Field of Search ............. 160/84.1, 370.2, DIG. 3; 296/97.7, 97.8, 97.9, 138

[56] References Cited

U.S. PATENT DOCUMENTS

| | | | |
|---|---|---|---|
| 289,573 | 7/1883 | Scott | 160/84.1 |
| 4,442,881 | 4/1984 | Monteath et al. | 160/370.2 X |
| 4,647,102 | 3/1987 | Ebrahimzadeh | 296/97 D |
| 4,736,980 | 4/1988 | Eubanks | 296/97 D |
| 4,758,042 | 7/1988 | Liu | 296/97 |
| 4,762,358 | 8/1988 | Levosky et al. | 296/97 G |
| 4,775,180 | 10/1988 | Phillips | 160/84.1 |
| 4,823,859 | 4/1989 | Park | 160/370.2 |
| 4,861,090 | 8/1989 | Gavrieli | 160/134 |
| 4,886,104 | 12/1989 | Eldridge, Jr. | 160/84.1 X |

Primary Examiner—Carl D. Friedman
Assistant Examiner—Derek J. Berger
Attorney, Agent, or Firm—Norvell E. Von Behren

[57] ABSTRACT

An improved mounting case for use with a shade unit mounted on a solid surface such as an automotive vehicle or a window of a house or the like. The case is designed to allow the shade unit to be mounted on both curved solid surfaces and on straight non-curved solid surfaces. The case has features which permit it to be pivoted in relation to the retractable shade unit to compensate for the curve in the solid surface. The case may also have features which permit it to be released from the solid surface so that the shade unit may be used elsewhere as desired.

7 Claims, 3 Drawing Sheets

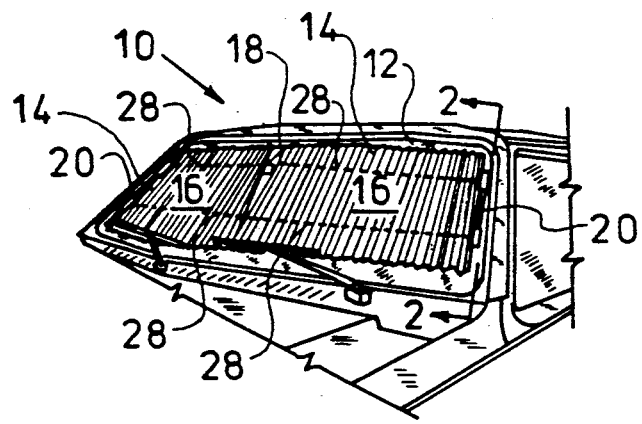
FIG-1
PRIOR ART
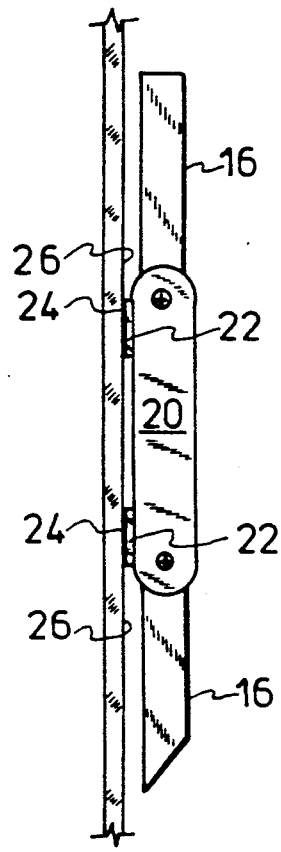
FIG-2
PRIOR ART
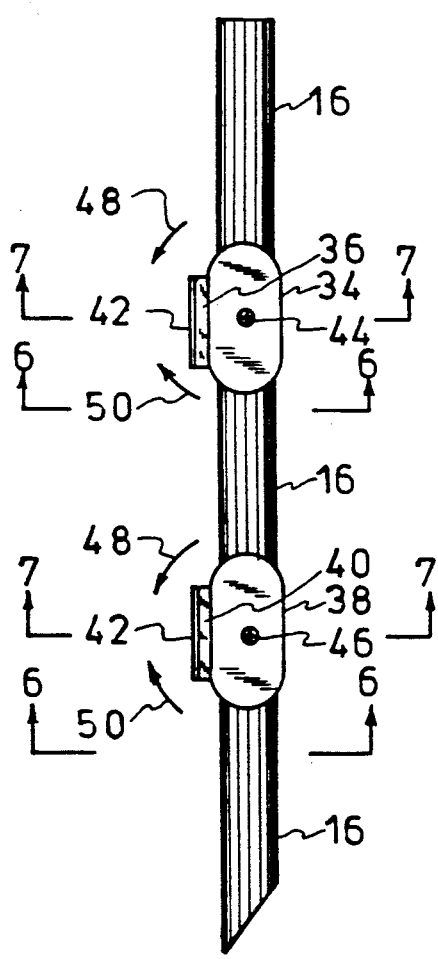
FIG-3
PRIOR ART
FIG-4
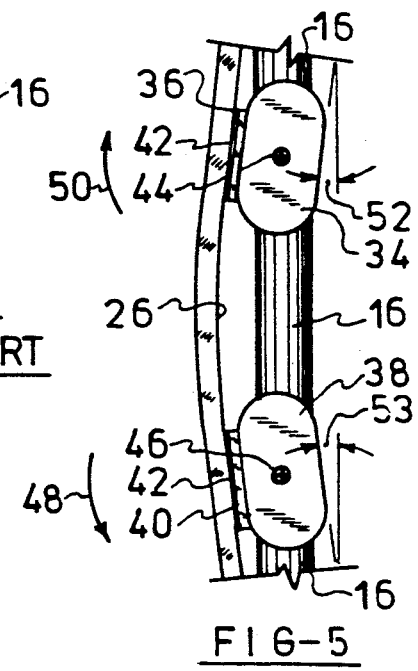
FIG-5

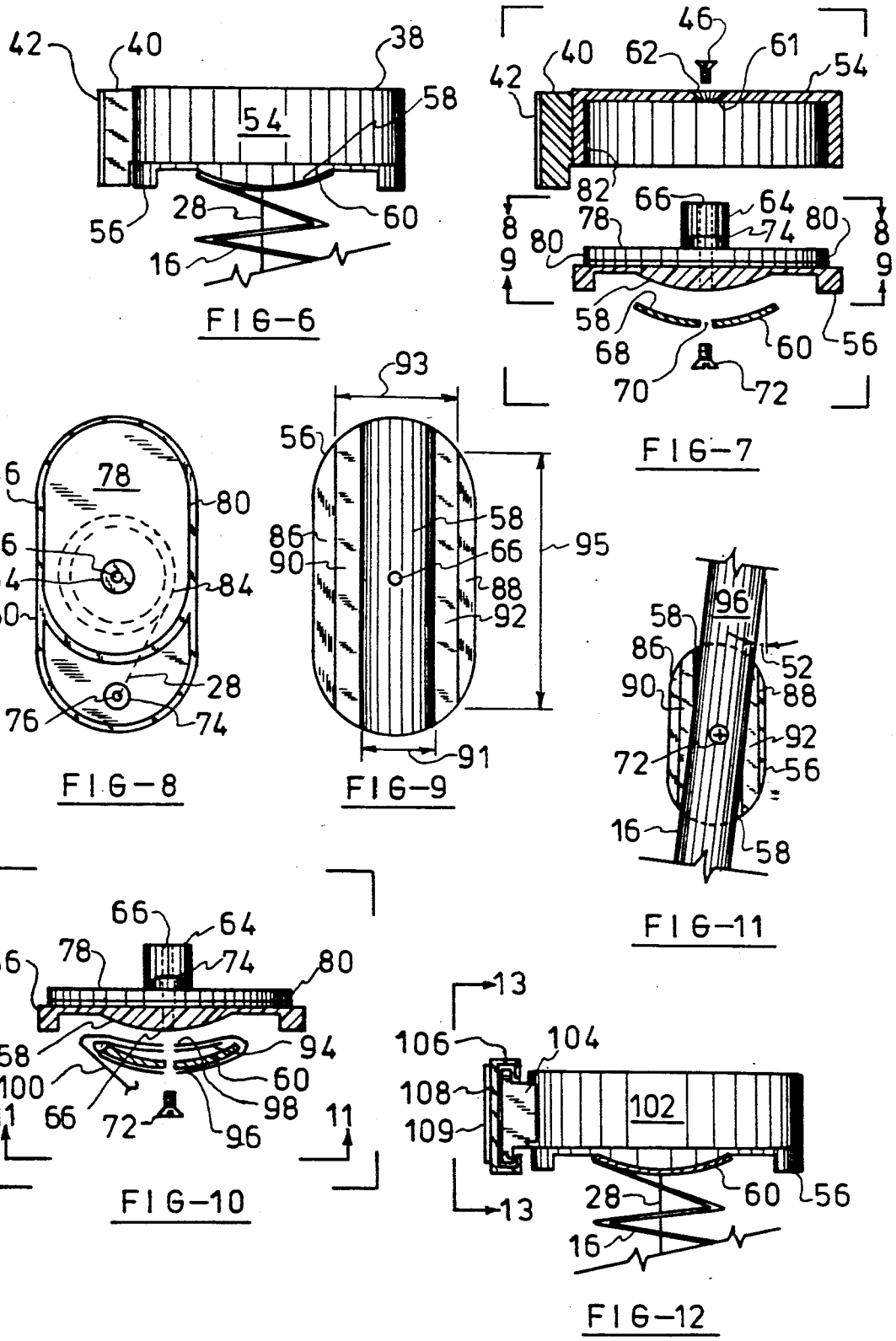

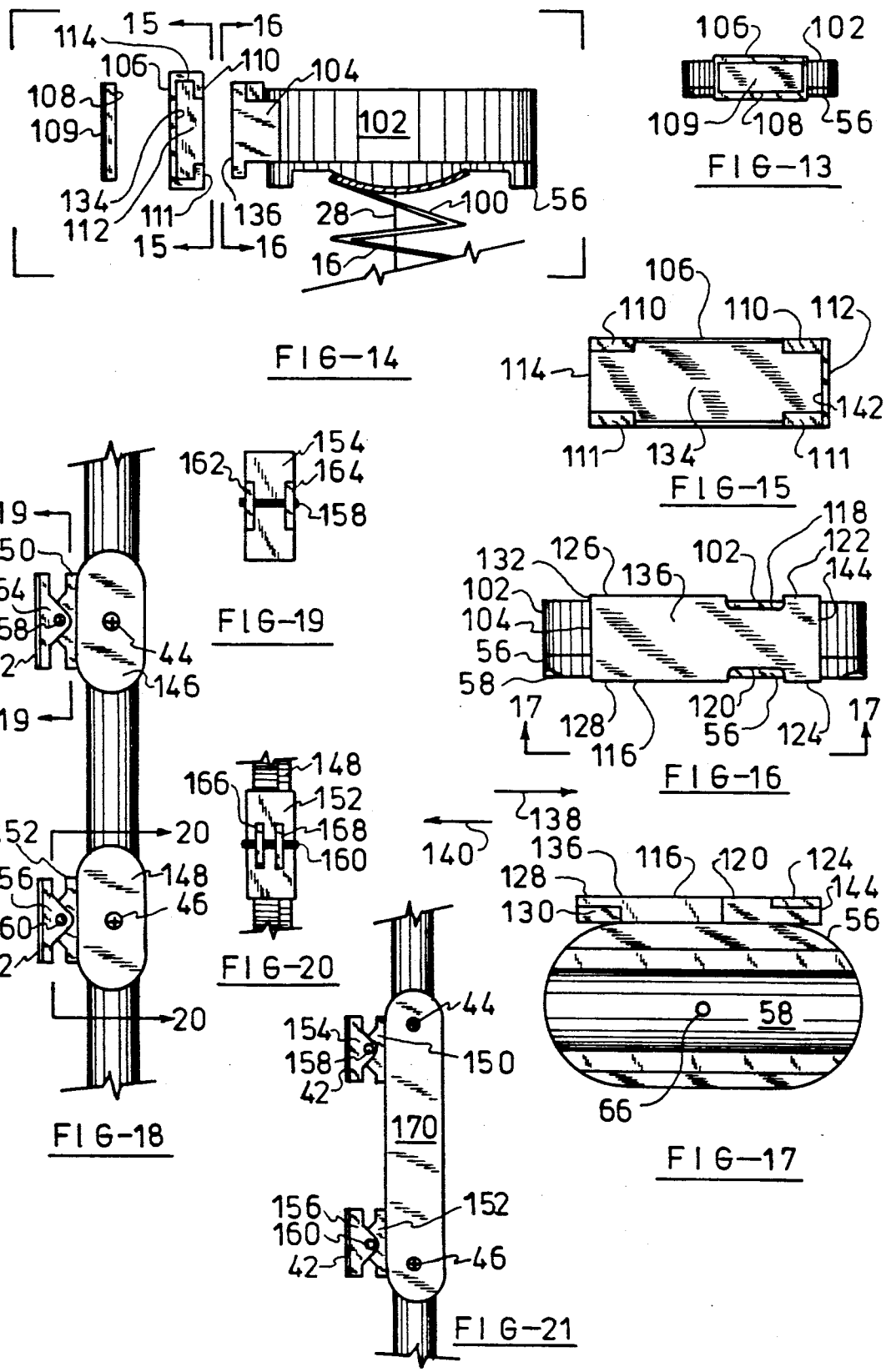

AUTOMATIC RETRACTABLE SHADE MOUNTING CASE

BACKGROUND OF THE INVENTION

This invention relates generally to an automatic retractable shade unit and more particularly to a new and novel mounting case for a retractable shade which permits the unit to be capable of being mounted on a solid surface such as curved windshields as well as on straight non-curved windshields or windows or the like.

With the increased number of automobiles and trucks available today along with the many models, the number and types of windshields can be exceedingly large. While the straight non-curved windshield is not often used, the curved windshield for automobiles and trucks has become the accepted standard. Most curved windshields are curved in both the vertical direction and in the horizontal direction. Many also have non-parallel vertical sides with generally parallel horizontal top and bottom surfaces.

These multi-curved windshields with non-parallel vertical sides are aesthetically pleasing and go well with the streamlined lines of the car or truck. However the multi-curved windshield can cause problems whenever an accessory is to be mounted or attached to the windshield since the curves are often very complex and hard to define. The applicant's automatic retractable shade, as described in his U.S. Pat. No. 4,775,180, issued Oct. 4, 1988, would be one example of such an accessory that could be attached to the windshield. This novel shade was designed to attach to the inside of a windshield and/or to also be removable for repositioning elsewhere in the vehicle in the embodiment shown in the patent.

The reader is invited to study this patent in depth for a fuller understanding of the novel shade unit and its pleated sun protecting features as well as its retraction mechanism positioned in the case of the shade. The present application is directed to improving on the mounting of the shade unit of U.S. Pat. No. 4,775,180 so that a more positive attachment of the unit can be accomplished regardless of the curve of the windshield or the non-curve or straightness of the window surface. In other words, the applicant's present invention provides a much improved universal type mounting of the shade unit onto any type of windshield which is then better able to withstand repeated removals and re-attachments of the shade unit to the windshield and is better able to hold to a windshield when the removal feature is not used.

Various suction cup mounting means have been attempted for sun shades as typified in the U.S. Pat. No. 4,861,090 of Gavrieli, the U.S. Pat. No. 4,823,859 of Park, the U.S. Pat. No. 4,758,042 of Liu, the U.S. Pat. No. 4,736,980 of Eubanks and the U.S. Pat. No. 4,647,102 of Ebrahimzadeh. Adhesive type mountings have also been used as shown in the U.S. Pat. No. 4,762,358 of Levosky et al and in the before described U.S. Pat. No. 4,775,180 of the applicant which also used suction cups as described. Permanent shade mountings have also been tried for window curtains as shown in the U.S. Pat. No. 289,573 of Scott. None of these past mounting methods would provide the holding ability of the applicant's present invention.

SUMMARY OF THE INVENTION

Accordingly the present invention provides an improved shade unit which has at least one case with a mounting means and a mounting surface attached to the case. In the preferred embodiment shown and described, two cases are used which are spaced apart as shown. Pivot means are used to pivotably attach the case or cases to the solid surface such as a curved or straight windshield. The pivot means permits the mounting means and mounting surface to rotate to the curvature of the windshield as required when installed. This then allows an increased surface contact of the mounting means on the windshield or other type of solid surfaces.

In the two case embodiment shown and described, at least one of the cases may be formed with a curved surface which mates with a curved surface, on the attached pleated shade, formed by the shade stiffener used. This mating of the curved surfaces provides a bias to the pivoted movement of the case to help hold the case in place when pivotably attached on the windshield or other type of solid surface.

Variations of the basic novel features are also shown and described herein and all are considered to be within the spirit and scope of the invention. The novel case mounting also may be used with a novel release means to release the case and attached pleated shade form the mounting means after the mounting surface of the mounting means has been attached to the windshield or other type of solid surface.

Accordingly, it is an object and advantage of the subject invention to provide a universal shade mounting case which will better attach to any type of solid surface such as a curved or straight windshield irregardless of the complexity of the curve of the solid surface.

Another object and advantage of the subject invention is to provide a case mounting which provides an increased mounting surface contact of the mount on the solid surface such as a windshield by pivoting the case in relation to the shade to be self aligned to the proper angle when installed.

Yet another object and advantage of the invention is to provide an improved mounting which will hold despite repeated disconnects and connects of the mounting.

These and other objects and advantages will become apparent after reviewing the drawings and after reading the Description of the Preferred Embodiment to be described hereinafter.

BRIEF DESCRIPTION OF THE DRAWINGS

FIG. 1 is a perspective view of an automotive vehicle showing an internally positioned pleated shade unit mounted on the inside of the windshield.

FIG. 2 is a cross-sectional view, taken along line 2—2 of FIG. 1 showing the mounting of the prior art shade unit on a straight or non-curved windshield.

FIG. 3 is a cross-sectional view similar to the FIG. 2 view, showing a representation of the problem of mounting the prior art shade unit on a curved windshield.

FIG. 4 is an elevational view of the applicant's modified shade unit showing a two case construction with the cases pivotable on the pleated shade section.

FIG. 5 is an enlarged elevational view similar to the FIG. 4 view showing how the pivoted cases of the modified shade unit will rotate on the pleated shade portion to conform to the curvature of the windshield.

FIG. 6 is a cross-sectional view, taken along lines 6—6 of FIG. 4 showing the details of both cases.

FIG. 7 is an exploded cross-sectional view, taken along lines 7—7 of FIG. 4 showing the details of both cases.

FIG. 8 is a plan view, taken along lines 8—8 of FIG. 7.

FIG. 9 is a plan view, taken along lines 9—9 of FIG. 7.

FIG. 10 is an exploded cross-sectional view similar to a portion of the FIG. 7 view showing the wrapping of the end portion of the pleated shade section on the curved stiffener.

FIG. 11 is a reduced plan view, taken along lines 11—11 of FIG. 10.

FIG. 12 is a cross-sectional view, similar to the FIG. 6 view, showing the release feature which may be incorporated into the modified case to release the case from the windshield.

FIG. 13 is a reduced elevational view, taken along lines 13—13 of FIG. 12.

FIG. 14 is a cross-sectional view, similar to the view of FIG. 12 showing the release feature exploded from the case of the shade unit.

FIG. 15 is an enlarged elevational view, taken along lines 15—15 of FIG. 14.

FIG. 16 is an enlarged elevational view, taken along lines 16—16 of FIG. 14.

FIG. 17 is an enlarged plan view, taken along lines 17—17 of FIG. 16.

FIG. 18 is an elevational view, similar to the view of FIG. 4, showing a modification of the pivotable mounting of the two case embodiment.

FIG. 19 is a plan view, taken along lines 19—19 of FIG. 18.

FIG. 20 is a plan view, taken along lines 20—20 of FIG. 18.

FIG. 21 is an elevational view, similar to the view of FIG. 3, showing a modification of the prior art case to incorporate the pivotable mounting feature used in the FIG. 18 two case embodiment.

DESCRIPTION OF THE PREFERRED EMBODIMENT

Referring now to FIGS. 1-3 of the drawings there will be described the problems that can be encountered with the mounting of a shade unit on a curved windshield. In FIG. 1 there is shown generally by the numeral 10 an automotive vehicle having a windshield 12. A shade unit 14 is mounted on the inside of the windshield 12 so that its pleated shade section 16 and retraction cords 28 may be pulled out as shown and attached at 18 to a similar unit mounted on the opposite side of the vehicle.

The applicant's previous style case 20 is designed, as shown in FIG. 2, with mounting means 22 having mounting surfaces 24 which can adhere to the inside surface 26 of the windshield 12. Reference should be made to the applicant's U.S. Pat. No. 4,775,180 for further details of this innovative pleated shade unit and the details are incorporated herein by reference.

When the prior art mounting shown in FIG. 2 was used on flat or straight windshield surfaces 26, the case would be held tightly to the windshield since the mounting surface 24 were in the same plane with each other. A slightly curved windshield surface 26 would also generally present little problems in the adherence of the case 20 to the windshield.

However, with the advent of the use of many complex curved windshields, a greater curvature of windshield, as shown in FIG. 3, could present problems. It can be seen in FIG. 3 how a large curvature of the windshield can result in a small attachment point at 30 and 32 with a larger non-attachment area 31 and 33 of the mounting surfaces 24. Since the mounting means 22 are fixed to the case 20, the strength of the mounting, using the prior art case, depended on the curvature of the windshield.

Referring now to FIG. 4 there is shown an elevational view of the applicant's novel modified shade unit designed with two spaced apart cases 34 and 38 which have mounting means 36 and 40 along with mounting surfaces 42. The spaced apart cases are designed in two pieces, as will be detailed later, with each piece being held together by the screws 44 and 46.

In order to accommodate the curved windshield solid surface, at least one of the cases 34 and 38 are designed to rotate or pivot downwardly in the direction of the arrow 48 and upwardly in the direction of the arrow 50. Preferably both cases 34 and 38 can rotate or pivot as desired within the spirit and scope of the invention. The pivotable design of the cases 34 and 38 permit the mounting surface 42 of each case to assume the correct angle, in relation to the curvature of the windshield, that will tightly hold the case onto the curved or straight windshield as well as other solid surfaces.

This can be seen in FIG. 5 which is an enlarged elevational view similar to the FIG. 4 view. It can be seen in FIG. 6 how the upper case 34 has been rotated upwardly in the direction of the arrow 50 while the lower case 38 has been rotated downwardly in the direction of the arrow 48. As a result the mounting means 36 and 40 are in the proper position so that their mounting surfaces 42 will totally contact the curved windshield.

The pivotable or rotatable cases 34 and 38 are automatically positioned by the attachment of the shade unit on the windshield. Since the mounting surface 42 contains a self stick adhesive pad, the forcing of the shade unit against the windshield to adhere the cases to the windshield will automatically shift or pivot each case to the proper angle 52 and 53 to maximize adherance. Each case 34 and 38 then pivots in relation to the pleated shade section 16 as shown in FIG. 5. Due to the particular design as will be discussed later, the angles 52 and 53 may be as great as 7 degrees and may be designed to be more or less than 7 degrees within the spirit and scope of the invention.

This will then accommodate most or all of the known windshield curvatures. In addition as before mentioned, it may be desirable to also make only one of the cases pivotable with the other case being non-pivotable to be able to handle a lesser number of windshield curvatures.

Referring now to FIGS. 6-11, there will be described in detail the construction of the modified case and how the pleated shade section 16 is fastened to the case so that the case can rotate relative to the shade section. FIG. 6 is a cross-sectional view, taken along lines 6—6 of FIG. 4 and shows how the cases 34 and 38 are constructed in two pieces with a hollowed out body section 54 and a removable body section 56. The removable body section 56 is formed with a convex curved section 58 and the pleated shade section 16 is fastened to this convex section.

A convex curved metal or plastic shade stiffener 60 is attached to the pleated shade section as will be described later and is positioned against the convex surface 58 of the removable body section. The convex shade stiffener 60 is able to pivot or rotate on the convex surface 58 thereby allowing the case to rotate relative to the shade section. How this is accomplished is shown in FIG. 7 which is an exploded cross-sectional view, taken along lines 7—7 of FIG. 4. The inner configuration of the removable body section 56 is shown and a cylindrical post 64 is formed thereon with an internal drilled and tapped hole 66 shown in dashed lines.

The cylindrical post 64 is positioned against the underside 61 of the hollowed out body section 54 and adjacent to a hole 62 in that section when these sections are assembled together. The screws 44 and 46 are then used to hold the two piece cases 34 and 38 together. The convex surface 58 of the body section 56 and the convex surface 68 of the stiffener 60 would be formed of the same approximate radius to assure that they could later be tightly mated together.

A hole 70 is also formed in the shade stiffener 60 as shown in FIG. 7 and a screw 72 forming a portion of the pivot means is used to hold the shade unit 16 onto the removable body section 56. A line guide 74 is also formed on the removable body section 56 and contains an inner hole 76 through which the retraction cords 28 are positioned. This can be seen more clearly in FIG. 8 where the retraction cords 28 are shown dashed along with the retraction mechanism 84. The retraction mechanism 84 is carried by the cylindrical post 64 and reference should be made to the applicant's U.S. Pat. No. 4,775,180 for more details on this mechanism. The flat planar surface 78 of the removable body section 56 terminates at the sides 80 which fit within the sides 82 of the hollowed out body section 54.

Referring now to FIG. 9, there is shown a view on the opposite side of the removable case 56 and the elongated convex surface 58 can be seen positioned between the raised lips 86 and 88 with the surfaces 90 and 92 positioned therebetween. The drilled and tapped hole 66 can also be seen in FIG. 9 and the screw 72 is screwed into this hole to permit the shade section to pivot as before mentioned. The width 91, of the convex section 58, would preferably be approximately 11/16 of an inch while the width 93 of the lip surface 90 would be approximately 1 inch with a length, shown by the numeral 95, of approximately 2⅜ of an inch. When formed thusly, the 7 degree angle 52 is obtainable for maximum movement of the case on the shade section.

Referring now to FIG. 10, there is shown an exploded cross sectional view similar to a portion of the FIG. 7 view showing the wrapping of the end portion of the pleated shade section on the curved stiffener 60. A first section 94 of the shade is positioned as shown against the concave portion of the stiffener 60. The shade is then positioned with a second section 96 against the convex portion of the stiffener and with a third section 98 against the first section 94. The first plate 100 of the shade 16 is then formed off of the third section 98. The three sections 94, 96 and 98 as well as the stiffener 60 have holes, not numbered, formed through them for positioning of the screw 72. This screw 72 holds the three sections 94, 96 and 98 as well as the stiffener 60 tightly against the curved surface 58 when the screw is turned into the drilled and tapped hole 66.

The stiffener 60 and the entire pleated section 16 is also able to pivot or rotate around the screw 72. This is seen in FIG. 11 where the pleated section 16 has been automatically pivoted to the proper angle of the curved windshield which can be up to approximately 7 degrees. The spring bias of the curved stiffener 60 will cause the shade section with stiffener in place to be held tightly on the convex surface 58 as the case rotates on the shade section.

Referring now to FIGS. 12-17 there are shown details of the construction of the case so that the case and shade can be attached to the windshield and can also be easily removed from the windshield to be used elsewhere in the car as detailed in the applicant's U.S. Pat. No. 4,775,180. FIG. 12 is a cross-sectional view, similar to the view of FIG. 6, and shows how the hollowed out body section 102 of the case may be modified with an integrally molded mounting pad 104. A separate C-shaped metallic bracket 106 is designed to be positioned over the mounting pad 104 and contains the mounting surface 108 with adhesive pad or adhesive attached as before described along with the tear off paper strip 109. This can also be seen in FIG. 13 of the drawing.

Turning now to FIG. 14, there is shown a cross-sectional view, similar to the view of FIG. 12 showing an exploded view of the release feature. The further details of how the release feature operates can also be seen in FIGS. 15-17. FIG. 15 is an enlarged view, taken along lines 15—15 of FIG. 14 and show a pair of lips 110 and 111 of each side of the C-shaped metallic bracket 106. An end stop 112 is also turned down on one end of the bracket 106 while the opposite end 114 is open. The outer surface 136 of the mounting pad 104 is designed to slide on the inner surface 134 of the metallic bracket. A pair of slots 118, 120, 130 and 132 along with the lips 122, 124 and the lips 126 and 128 on the mounting pad 104 engage the lips 110 and 111 on the C-shaped bracket 106 as can readily be discerned by studying FIGS. 15-17.

When constructed thusly, the entire case may be released from the C-shaped bracket 106, after the bracket has been attached to the windshield, by moving the case in the direction of the arrow 138. The case may then be re-attached to the C-shaped mounted bracket 106 by moving the case in the direction of the arrow 140 until the end stop 112 engages on its inside surface 142 against the end 144 of the mounting pad 104.

While one embodiment of the release means has been shown in the drawings, other modifications are considered to be within the spirit and scope of the invention. In a similar manner, other means for pivotably attaching the case to the windshield are also within the purview of the applicant's invention. For example the two case configuration could be modified by providing a redesigned case 146 and 148 which would have means to pivot the mounting bracket on the case instead of the case on the shade.

This is shown in FIGS. 18-20 where pivot brackets 150 and 152 could be formed on the modified cases 146 and 148 and would be pivotably attached to the mounting brackets 154 and 156 by the pins 158 and 160. The mounting brackets 154 and 156 then could pivot on the mounting brackets 150 and 152 of the cases 146 and 148 to assume the windshield curvature as before described when being fastened thereto. FIGS. 19 and 20 show how the bifurcated arms 162 and 164 on the mounting brackets 154 are used to be positioned outside of the bifurcated arms 166 and 168 on the pivot bracket 152 shown in FIG. 20. This construction could also be modified to include the release feature of FIGS. 12-17 using the C-shaped metallic bracket 106 and the mounting pad 104 within the spirit and scope of the applicant's invention.

FIG. 21 also shows how the applicant's original one piece case could be modified to the case shown by the numeral 170 with the modified pivot construction of FIGS. 18-20 applied to the one piece case.

From the foregoing it can be seen that all of the objects and advantages of the applicant's invention have been accomplished by the novel improved vehicle shade with its improved pivoted case or pivoted case mounting bracket that will better adhere to a solid surface such as a curved windshield as well as a straight windshield and to other types of solid surfaces such as windows, walls and the like. Nevertheless other changes may be made to the various parts, structures and arrangements of the parts within the spirit and scope of the invention. While the embodiments shown and described have been given by way of illustration only, the applicant is not to be limited only to those embodiments shown and described in the foregoing specification.

Having described my invention, I claim:

1. In a shade unit having at least one container and having a shade section attached to the container, the unit being designed for positioning on and attached to one side of a solid surface, the unit being designed to be attachable to both a varying curved solid surface and also to a straight non-curved solid surface, the improvement comprising:
   (a) The unit having at least one container with mounting means for mounting the container on the solid surface, the container being formed with a curved surface and a portion of the shade section being formed with a mating curved surface on one end thereof for positioning adjacent to the juxtaposed curved surface on the container, the mating of the juxtaposed curved surfaces on the container and on the shade providing a bias to the movement of the container to hold the container in place when attached on the solid surface;
   (b) means, associated with the container, for pivotally attaching the shade unit on the solid surface, the pivotally attached shade unit permitting at least one of the mounting means and at least one of the containers to rotate to the curvature of the solid surface as required when installed in order to obtain increased mounting surface contact of the mounting means on the solid surface thereby providing an improved mounting of the shade unit on the solid surface; and
   (c) the longitudinal plane of the container is pivoted relative to the longitudinal plane of the shade section.

2. The improvement as defined in claim 1 wherein the mating curved surface on the shade section is formed by a curved shade stiffener positioned within a portion of the shade section.

3. The improvement as defined in claim 2 wherein the juxtaposed curved surface formed in the container is formed in a convex shape on the outside of the container.

4. In a shade unit with a shade section for positioning on and attaching to one side of a solid surface which may have a varying curved surface, the improvement comprising;
   (a) at least one container with mounting means for mounting the container on the solid surface; and
   (b) pivoted mounting means, formed on one side of the container, for pivotally mating a portion of the shade unit with the container, the pivoted mounting means being formed in part by a curved configuration on the container and in part by a curved configuration on the shade section, the two curved configurations permitting the container to rotate to the curvature of the solid surface as required when installed in order obtain increased mounting surface contact of the mounting means on the solid surface.

5. The improvement as defined in claim 4 wherein the shade unit has two spaced apart containers with mounting means, with at least one of the two spaced apart containers having curved pivoted mating means formed on one side of the container.

6. An improved retractable shade unit having an elongated pleated shade section for positioning on one side of a solid surface and designed to prevent solar heat transfer through the solid surface, the shade unit being designed to attach both to a surface which is curved and a straight non-curved solid surface, comprising:
   (a) at least one container having mounting means for mounting the container on the curved type solid surface and on the straight non-curved type solid surface;
   (b) curved pivot means, formed on one side of the container and on a portion of the shade section, for pivotally attaching the shade section and container to either type of solid surface, the curved pivot means permitting the mounting means to be self-aligned in a different plane than the plane of the pleated shade section in order to obtain increased mounting surface contact of the mounting means on the solid surface;
   (c) means, associated with the container, for retracting the elongated pleated shade section to a position adjacent to the container when the pleated shade is not in use; and
   (d) means, associated with the elongated pleated shade section, for holding the plated shade section across the solid surface and for fastening the pleated shade section to an adjacent surface.

7. The shade unit as defined in claim 6 further comprising release means having a mounting surface, the release means being associated with the mounting means, for releasing the container from the release means after the mounting surface of the release means has been attached to the solid surface.

* * * * *